(12) United States Patent
O'Neill

(10) Patent No.: US 11,998,406 B2
(45) Date of Patent: Jun. 4, 2024

(54) METHOD OF PROVIDING DENTAL IMPLANT BASED RESTORATIONS

(71) Applicant: Brian M. O'Neill, Holland, OH (US)

(72) Inventor: Brian M. O'Neill, Holland, OH (US)

( * ) Notice: Subject to any disclaimer, the term of this patent is extended or adjusted under 35 U.S.C. 154(b) by 623 days.

(21) Appl. No.: 17/013,570

(22) Filed: Sep. 5, 2020

(65) Prior Publication Data
US 2020/0405460 A1 Dec. 31, 2020

Related U.S. Application Data

(63) Continuation of application No. 15/880,351, filed on Jan. 25, 2018, now abandoned.

(60) Provisional application No. 62/450,099, filed on Jan. 25, 2017.

(51) Int. Cl.
| | |
|---|---|
| A61C 13/00 | (2006.01) |
| A61C 5/77 | (2017.01) |
| A61C 7/00 | (2006.01) |
| A61C 8/00 | (2006.01) |
| A61C 9/00 | (2006.01) |
| A61C 13/34 | (2006.01) |

(52) U.S. Cl.
CPC .......... *A61C 13/0004* (2013.01); *A61C 9/004* (2013.01); *A61C 5/77* (2017.02); *A61C 7/002* (2013.01); *A61C 8/0093* (2013.01); *A61C 13/34* (2013.01)

(58) Field of Classification Search
CPC ..... A61C 13/00; A61C 13/0004; A61C 13/34; A61C 9/0004; A61C 5/77; A61C 7/002; A61C 8/009; A61C 8/0089; A61C 8/0001; A61B 17/1703; A61B 17/171; A61B 17/176
See application file for complete search history.

(56) References Cited

U.S. PATENT DOCUMENTS

| | | | |
|---|---|---|---|
| 2011/0060558 A1* | 3/2011 | Pettersson | A61C 1/084 703/1 |
| 2012/0035889 A1* | 2/2012 | Lawitschka | A61C 13/34 703/1 |

* cited by examiner

*Primary Examiner* — Cris L. Rodriguez
*Assistant Examiner* — Drew S Folgmann
(74) *Attorney, Agent, or Firm* — Gamburd Law Group LLC

(57) ABSTRACT

A method for designing and manufacturing implant based restorations is disclosed. The method involves the use of Scannable Temporary Anatomic References to provide very reliable, fixed points of reference to enable a technician to relate and superimpose the dental implant position to a pre-planned restoration with a very high degree of accuracy throughout the entire workflow. The method can be carried out by placing Scannable Temporary Anatomic References in a jaw, on teeth, and/or in implants, collecting images by scanning a mouth, relating those images to images of a appearance of desired dental implant based restoration, placing an implant in the jaw, scanning the scannable temporary anatomic references to create a new set of images, relating the images, and producing a restoration based on the images.

18 Claims, 4 Drawing Sheets

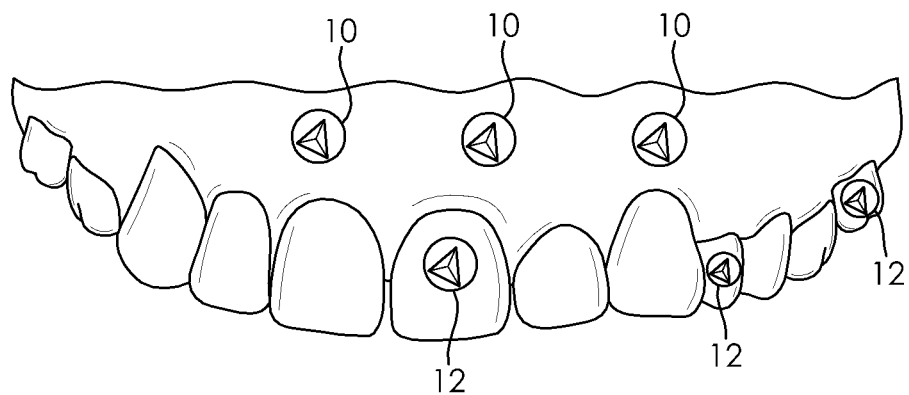
FIG. 1
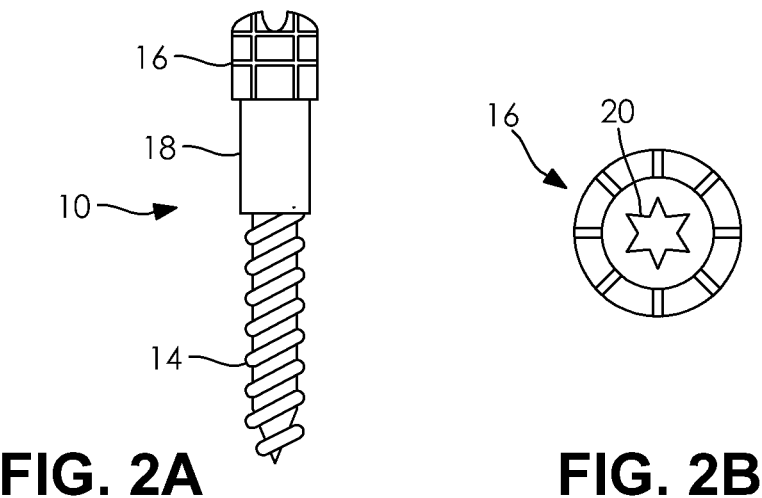
FIG. 2A   FIG. 2B
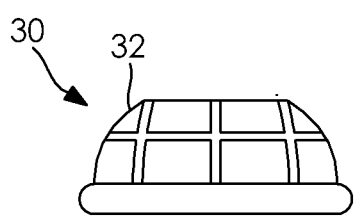   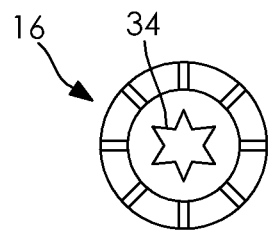
FIG. 3A   FIG. 3B

METHOD OF PROVIDING DENTAL IMPLANT BASED RESTORATIONS

CROSS-REFERENCE TO A RELATED APPLICATION

This application a continuation of and claims the benefit of and priority to U.S. patent application Ser. No. 15/880,351, filed Jan. 25, 2018, titled "Method of Designing and Producing Dental Implant Based Restorations", which is a nonprovisional of and claims the benefit of and priority to U.S. Provisional Patent Application No. 62/450,009, filed Jan. 25, 2017, titled "Method for Designing Dental Implant Based Restorations", which are commonly owned herewith, and all of which are hereby incorporated herein by reference in their entireties with the same full force and effect as if set forth in their entireties herein.

BACKGROUND

Field of the Inventions

This application is concerned with methodology and apparatus for designing and producing complex dental implant based restorations.

Description of the Related Art

Digital technology has penetrated all aspects of modern dental practice both in the clinical and dental lab environments leading to improved collaboration, communication, and precision in the design and manufacturing of contemporary dental implant based restorations. Technological advances necessitate the creation of an analogous digital workflow for already accepted and established processes and procedures comprising the current standards of care both in the clinical and non-clinical (lab) realms. These new workflow protocols will invariably require their own instrumentation/armamentarium to fully leverage the power of digital technology and streamline these processes in order to meet the high degree of efficiency, accuracy, and precision expected from Digital (CAD/CAM) Dentistry.

When replacing teeth, dentists have the unique challenge of restoring both form (esthetics) and function (bite/occlusion). These challenges are most demanding when addressing a tooth or teeth that are visible in the "esthetic zone"—the teeth and gums visible that are framed by the lips when smiling. In dentistry, a common goal is to replace or restore a missing or severely damaged tooth/teeth in a way that is so precise that it is not obvious to a casual observer at conversational distances. One criterion is to match the color (optical properties), shape, and texture of the patient's neighboring teeth (natural or already restored with a crown, veneer, etc.). The other is to preserve the patient's existing gingival anatomy periodontal architecture (guns). Achieving harmony between these two criteria is key to success and is dependent on proper planning to meet the biological, functional, and cosmetic needs and expectations of the patient. Systematic approaches to the examination and parameters for treatment planning with respect to the face are well described in the dental literature. See, for example, Coachman C, Van Dooren E, Gurel G, Landsberg C J, Calamita M A, Bichacho N. Smile design: From digital treatment planning to clinical reality. In: Cohen M (ed). Interdisciplinary Treatment Planning. Vol 2: Comprehensive Case Studies. Chicago: Quintessence, 2012: 119-174.; Spear F M. The maxillary central incisor edge: A key to esthetic and functional treatment planning. Compend Contin Educ Dent 1999; 20:512-516; and Kois J C. Diagnostically driven interdisciplinary treatment planning. Seattle Study Club J 2002; 6:28-34.

Digital tools designed for both clinical and laboratory users have greatly enhanced these processes and undoubtedly will continue to improve as technologies continue to be developed.

In the esthetic zone, it is a well-established practice to place dental implants at the time of tooth/teeth extraction and to immediately restore them with a crown or bridge supported by these implants, provided that certain criteria are met. These criteria typically include adequate 3D bone and soft tissue availability and attainment of primary stability of the implant (satisfactory minimum tightness) at the time of implant placement. Restoration types range from, but are not limited to, utilization of the patient's natural tooth or existing restoration, creation of a provisional (temporary), restoration with chairside technique, an screw-retained CAD/CAM provisional restorations. See, for example, Kois J C. Diagnostically driven interdisciplinary treatment planning. Seattle Study Club J 2002; 6:28-34; Cosyn J, Eghbali A, DeBruyn H, Collys K, Cleymaet R, DeRouch T. Immediate single-tooth implants in the anterior maxilla: 3-year results of a case series on hard and soft tissue response and aesthetics. J Clin Periodontol. 2011 August; 38(8):746-53; Malo P, Araujo Nobre M D, Lopes A, Rodrigues R. Double Full-Arch Versus Single Full-Arch, Four Implant-Supported Rehabilitations: A Retrospective, 5-Year Cohort Study. J Prosthodont. 2015 June; 224(4):263-70. Doi: 10.1111/jopr.12228; Papaspyridakos P, Rajput N, Kudara Y, Weber H P. Digital Workflow for Fixed Implant Rehabilitation of an Extremely Atrophic Edentulous Mandible in Three Appointments. J Estht Restor Dent. 2017 May 6; 29(3):178-188; and Lopes A, Malo P, de Araujo Jobre M, Sanchez-Fernande E, Gravito I. The NobelGuide®/All-on-4® Treatment Concept for Rehabilitation of Edentulous Jaws: A Retrospective Report on the 7-Years Clinical and 5-Years Radiographic Outcomes. Clin Implant Dent Relat Res. 2017 April; 19(2):233-244;

Since CAD/CAM provisional restorations are fully customizable, and rendered in a 3D software environment, they prove to be the most esthetic, hygienic, and optimal providers of three-dimensional support of the periodontal architecture. These designs can precisely replicate a patient's existing 3D tooth morphology, may be mirrored from a patient's contralateral tooth, or selected from a multitude of software libraries. They are easily delivered and require significantly less chairside modifications and adjustments than the other non-CAD/CAM methods.

Dental implantation is a method of tooth replacement that has undergone stark transformations since it was introduced forty years ago. These changes have led to improvements in the physical design and make-up of the implant fixture and its corresponding components, as well as in the method of delivery/installation (non-guided vs. guided). The three-dimensional position of the implant directly influences the outcome of the restoration and requires input from all members of the dental team during the planning process. Non-guided surgery is a method of placing dental implants that is extremely operator-dependent. As such, this method is highly variable in terms of reproducibility of the three-dimensional position of the implant and subsequent outcome. Guided implant surgery is the current state-of-the-art within implant dentistry. See, for example, Choi W, Nguyen B C, Doan A, Girod S, Gaudilliere B, Gaudilliere D. Freehand Versus Guided Surgery: Factors Influencing Accuracy of Dental Implant Placement. Implant Dent. 2017 Jul. 20; Karami D, Alborzinia H R, Amid R, Kadkhodazadeh M, Yousefi N, Badakhshan S. In-Office Guided Implant Placement for Prosthetically Driven Implant Surgery. Craniomaxillofac Trauma Reconstr. 2017 September; 10(3):246-254; and Ganz S D. Three-dimensional imaging and guided surgery for dental implants. Dent Clin North Am. 2015 April; 59(2):265-90.

Software is used to interpret data from the patient depicting both the skeletal anatomy (CD scan, CBCT scan, DICOM) and data from the patient's dental models depicting the teeth and gum forms (stl files). See, for example, Benavides E, Rios H F, Ganz S D, An C H, Resnik R, Reardon G T, et al. Use of cone beam computed tomography in implant dentistry: the International Congress of Oral Implantologists consensus report. Implant Dent 2012; 21(2): 78-86; and Renne W, Ludlow M, Fryml J, et al. Evaluation of the accuracy of 7 digital scanners: An in vitro analysis based on 3-dimentional comparisons. J Prosthet Dent. 2016; 16:30514-30515. These data sets are merged together to create a model that contains the essential anatomic elements to plan and perform the virtual surgery. The success of the merging process is dependent on the ability to superimpose these data sets. This critical superimposition process may be manual where the operator manually selects fixed points of reference (points and/or surfaces) available in both data sets, or it may be automated with software. Automation, with the ability to edit or refine, has become the industry standard.

Once these data volumes have been merged, the implant(s) may be planned using the principles of prosthetically-driven treatment planning. A clear understanding of where the teeth need to be determines the ideal placement position for the proposed dental implant. See, for example, Stapleton B M, Lin W S, Ntounis A, Harris B T, Morton D. Application of digital diagnostic impression, virtual planning, and computer-guided implant surgery for a CAD/CAM-fabricated, implant-supported fixed dental prosthesis: a clinical report. J Prosthet Dent. 2014 September; 112(3): 402-8; Abduo J, Bennamoun M, Tennant M, McGeachie J. Impact of digital prosthodontics planning on dental esthetics: Biometric analysis of esthetic parameters. J Prosthet Dent. 2016; 115:57-64; and Joda t, Bragger U. Complete digital workflow for the production of implant-supported single-unit monolithic crowns. Clin Oral Implants Res. 2014; 25:1304-1306. Once a plan is in place, the team assesses if satisfactory anatomy is present or if grafting is required to enhance bone and/or soft tissue volume. If the criteria are met to place the implant(s), a surgical guide is generated. A surgical guide is a physical jig encoded with the implant position relative to landmarks defined during the planning process (ie. Adjacent teeth, residual ridge) allowing the operator to transfer the virtual design to the physical patient. The design of these guides is influenced by the surgical system being used as there are many systems and each one has its own proprietary instrumentation. Surgical guides can be made of a variety of materials ranging from polymers to metal and may be custom designed to meet the preferences of the operator and the needs of the patient.

After the implant(s) have been placed it is necessary to obtain an impression to communicate the actual implant position to the dental technician in order to begin the creation of the physical tooth/teeth. The current accepted methods of impression-taking are digital and analog. See, for example, Amin S, Weber H P, Finkelman M, El Rafie K, Kudara Y, Papaspyridakos P. Digital vs. conventional full-arch implant impressions; a comparative study. Clin Oral Implants Res. 2016 Dec. 31. Digital impression devices generally use light reflectivity to perform surface mapping of the teeth, alveolus (tooth bearing segment of the jaws), gums and bite relationship (occlusion). As the accuracy of the scanners improve and the scanners themselves become more miniaturized and ergonomic, they will rapidly become the standar of care. The other form of impression taking is analog—the operator chooses a physical impression material that they feel is best suited to the needs of the patient and uses it to obtain an impression of the teeth, alveolus, gums, etc.

Another method of accurately acquiring the implant fixture's 3D position and rotational timing is the use of photogrammetry. Photogrammetry is the science of making measurements of photographs, especially for recovering the exact positions of surface points. Photogrammetry is an old as modern photography, dating to the mid-$19^{th}$ century. In the simplest example, the distance between two points that lie on a plane parallel to the photographic image plane can be determined by measuring their distance on the image, if the scale(s) of the image is known.

Photogrammetric analysis may be applied to one photograph or may use high-speed photography and remote sensing to detect, measure, and record complex 2D and 3D motion fields by feeding measurements and imagery analysis into computational models in an attempt to successively estimate, with increasing accuracy, the actual 3D relative motions.

From its beginning with the stereoplotters used to plot contour lines on topographic maps, photogrammetry now has a very wide range of uses including implant dentistry. See, for example, Penarrocha-Oltra D1, Agustin-Panadero R, Bagan L, Gimenez B, Penarrocha M. Impression of multiple implants using photogrammetry: description of technique and case presentation. Med Oral Patol Oral Cir Bucal. 2014 Jul. 1; 19(4):e366-71.

No matter the method, once the impression is obtained, it is brought into the design environment and the restoration is designed by the technician. It is then manufactured from a preselected material with the design specifications in mind.

Once generated and finished (polished, customized) in the lab, the restoration is delivered in the patient's mouth and checked for fit. Once modifications have been made, the process is complete.

The above workflow for single teeth and short span dental restorations is well described using both guided and non-guided surgical techniques and digital versus analog impression making. It has not been as widely accepted in the instance of full arch (complete upper/lower) reconstruction. This is largely due to the current limits of intraoral scanning technology and the extensive alteration of landmarks resulting from the surgical process.

The current widely accepted method for full arch restoration delivery at the time of implant placement is the conversion process of a preexisting or prefabricated restoration (i.e. denture). See, for example, Balshi T J1, Wolfinger G J. Conversion prosthesis: a transitional fixed implant-supported prosthesis for an edentulous arch—a technical note. Int J Oral Maxillofac Implants. 1996 January-February; 11(1):106-11. While this method is well established and effective, it is also quite lengthy and frequently requires that the surgeon performs the conversion himself, has the patient's restoring dentist onsite to perform the conversion, or bring a lab technician onsite to aid this process. This requires the coordination of multiple office schedules and requires the surgeon to have in inventory an array of implant components and materials to appropriately address the individual details unique to each patient's needs. This workflow has been improved through the use of "stackable" guides designed to maintain frames of reference throughout the process.

The primary challenge of creating a CAD/CAM prosthesis without conversion or retrofitting, while using an entirely digital workflow, is that digital and/or digitized dental records/models frequently do not provide reliable and reproducible points of reference to maintain three-dimensional accuracy throughout the surgical and design process. This directly inhibits the critical step of superimposing "before" and "after" situations. This is largely due to the fact that the treatment of such patients frequently requires removal of teeth, reflection of soft tissue, and/or resection of hard and/or soft tissues, thus altering the shape/geometry and otherwise presence of fixed landmarks involving both the hard and soft tissue structures of the jaws and surrounding dentoalveolar regions.

The absence of reliable references that can be maintained and/or unaltered throughout the treatment process, coupled with the precision of design software, create inaccuracies which require significant post-production modification and retrofitting, thus extending the number of patient visits (appointments), as well as their length, resulting in increased cost and lack of professional productivity. Existing methodologies are centered around this lengthy conversion process.

SUMMARY OF THE INVENTION

The invention is a new methodology, and hardware, to enable the clinician to incorporate easily placed, highly reliable, reversible, fixed points of three-dimensional reference so that the dental lab technician will have a highly reliable method of three-dimensional spatial orientation allowing for precise superimposition of the digital or digitized "before" and "after" dental models with respect to the patient's maxillofacial anatomy required for the three-dimensional virtual design, and subsequent manufacturing of a screw-retained, immediate, implant-supported dental restoration without a lengthy conversion process while drastically reducing the need for post-production modification. These points of reference are created through improvements made to existing devices so that they will work with the proposed methodology (e.g. modified orthodontic bracket, modified implant fixture mounts, modified prosthetic screws and modified temporary anchorage device/TADs). Consider Ferguson J W, Luyk N H. Control of vertical dimension during maxillary orthognathic surgery. A clinical trial comparing internal and external fixed reference points. J Craniomaxillofac Surg. 1992 December; 20(8):333-6; and Cope J B. Temporary anchorage devices in orthodontics: A paradigm shift. Semin Orthod. 2005; 11:3-9. Fixed reference point methodologies have been incorporated into other clinical procedures ranging from orthognathic maxillary positioning to stereotactic radiotherapy. See Ruckman P, Schlieve T, Borba A M, Miloro M. External Reference Nasal Pin for Orthognathic Maxillary Positioning: What is the Proper Method of Placement? J Oral Maxillofac Surg. 2016 February; 74(2):399.e1-9.

The prosthodontic management of complex rehabilitations requires several stages of treatment including one or more provisional restorations. The design and adjustments of the provisional are made to achieve an optimal functional and esthetic outcome for the patient. However, the adjustments needed are both time and cost consuming. Therefore, once a satisfactory provisional restoration is made, the information should be available during the following stages of treatment.

An extension of this method also allows for "digital cross mounting" during the design of the final restoration allowing the dentist and technician to capture the patient's temporary restoration, and all of its occlusal modifications, and relate it to the three-dimensional implant position further allowing the creation and delivery of a final restoration identical to the provisional, thus minimizing the need for extensive chairside adjustments. See Venezia P, Torsello F, D'Amato S, Cavalcanti R. Digital cross-mounting: A new opportunity in prosthetic dentistry. Quintessense Int. 2017; 48(9):701-709.

According to current practices, a patient is examined and a treatment is planned in the usual manner by their restoring dentist with all appropriate necessary diagnostic modalities in accordance with the accepted standard of care. This includes, but is not limited to, photographs (.jpeg file format), videos (.mov, .mp4 file format), Cone Beam Computed Tomography—CBCT (Digital Imaging and Communications in Medicine (DICOM) format) and three-dimensional records (.stl file format) of the patient's existing dental situation (hard and soft tissue models) either indirectly by using bench top optical scanning technology or by directly acquiring digital scans of the patient by utilizing approved intraoral scanning devices. The collection of this array of data sets allows for the creation of the patient's "digital dental clone"—a highly precise software-generated depiction of the patient allowing for highly precise digital treatment planning. Most of the widely used dental laboratory software allow for this.

Once the "digital clone" of the patient is generated, the dental team (restoring dentist, dental specialist(s) and laboratory technician(s)) collaborate to create a digital prototype of the desired restoration. This is typically performed by first establishing the patient's unique esthetic/cosmetic desires. As cosmetics are a very subjective and artistic component of treatment, an esthetic mock-up or "trial smile" strategy is used. This enables the patient to better visualize the planned restoration in a way that is fully reversible, non-technical and allows them to contribute to the design of their future smile. Once the esthetic element is approved by the patient, the dental team looks to incorporate functional and biomechanical consideration to generate the final design/working prototype of the prosthesis.

This process typically takes place in virtual or CAD/CAM environment and represents the current state-of-the-art in dentistry today. As in architecture, the design is subjected to engineering principles. Obstacles are identified, compromises are made, and the final restoration design is completed. This design is the foundation on which other guides/templates (i.e. bone reduction, implant surgical guides, etc.) are produced when utilizing a guided technique and/or incorporating immediate restorations.

The final restoration is fully rendered into a .stl file or other proprietary file format necessary for CAM output. This file format allows the designed restoration to be precisely illed and/or printed three-dimensionally during the computer aided manufacturing (CAM) phase from any one of a variety of FDA approved material types.

The .stl file format is also easily imported into an array of dental designer (CAD/CAM) software such that the design prototype may be created in one software and subsequently used to guide a design into a completely different CAD/CAM software. This is a currently accepted workflow.

Most CAD/CAM software in use today allows for superimposition of .stl files and/or other data sets. This enables the dental team to relate the patient's actual situation to the intended result. When patients have teeth that are stable, they are typically used for this process. When the patient has no natural teeth, a removable prosthesis and/or soft tissue landmarks may be utilized, but they are frequently unreliable.

In the context of full arch implant rehabilitation, these landmarks are either removed and/or altered during the surgical process, which prevents them from being used at a later stage as reliable points of reference. The lack of precise references to relate the dental implants to the pre-planned prosthetic design is the main reason that CAD/CAM temporary restorations cannot be delivered without time-consuming chairside retrofitting. This process is referred to as the "conversion process" and is the most widely used method for provisional (temporary) prosthesis creation and delivery. All current surgical protocols are built around this method.

Accordingly, it is an object of the invention to provide highly reliable and reversible points of reference critical for the digital superimposition necessary to designing and manufacturing implant supported restorations to support a fully digital protocol in order to rehabilitate patients with debilitated dentitions and/or large edentulous regions.

It is a further object of the invention to improve the restoration manufacturing process and eliminate/reduce the need for complex retrofitting procedures and occlusal adjustment, thereby reducing chair time for the patient and providing an improved overall experience.

It is yet another object of the invention to increase accuracy in restorations in a more efficient process which will save the professional time and expense.

It is a further object of the invention to provide an improved, combined, scan body/implant fixture mount to further increase efficiency in the surgical workflow process.

It is a still further object of the invention to reduce the likelihood of user error encountered in the manual selection of specific implant components and connections by the technician and/or dentist, as well as improving inventory control.

It is a further object of the invention to provide improved hardware for use in Photogrammetry—the science of making measurements from photographs utilizing a stereo camera capable of capturing implant positions and angulations to obtain an open STL file containing every geometry needed to design the final structure.

It is yet another object of the invention to provide hardware that serves as a "verification jig" and "pathway for scanning" in order to reduce or eliminate intraoral scanning errors created by the surgical alteration of the dentoalveolar anatomy.

It is a still further object of the invention to enhance the accuracy of milling algorithms and the resulting dental restorations.

It is another object of the invention to increase the precision with which the implant/abutment position can be related to the patient's restoration and all of the adjustments made to it during the prototype/provisional phase and still be available for use in creating the final restoration.

It is a still further object of the invention to provide a method for producing restorations, using videography with motion capture technology (MOCAP), to create highly accurate, patient specific occlusal models that can be incorporated into the design process leading to restorations that are biomechanically superior, with improved fit and comfort, and more resistance to stress and material failure.

It is another object of the invention to make the professionals' work easier and improve workflow by providing the technician with additional stl layers to be used within the design environment.

Another object of the invention involves the use of temporary, but stable and reversible points of reference, to bring augmented reality technology to the clinic and the lab improving and workflow accuracy and communication. Possibilities range from procedural wizards to real-time preparation guides with immediate feedback with respect to preparation form to specific material needs.

BRIEF DESCRIPTION OF THE DRAWING FIGURES

FIG. 1 is a front view of a jaw illustrating a step in method according to the invention involving the use of tooth supported scan bodies and/or a skeletally supported scan body.

FIG. 2A is a side view of a skeletally supported scan body.

FIG. 2B is a top view of a skeletally supported scan body.

FIG. 3A is a side view of a tooth supported scan body.

FIG. 3B is a top view of a tooth supported scan body.

DETAILED DESCRIPTION OF THE INVENTION

Figures 4A, 4B, 4C, 4D:
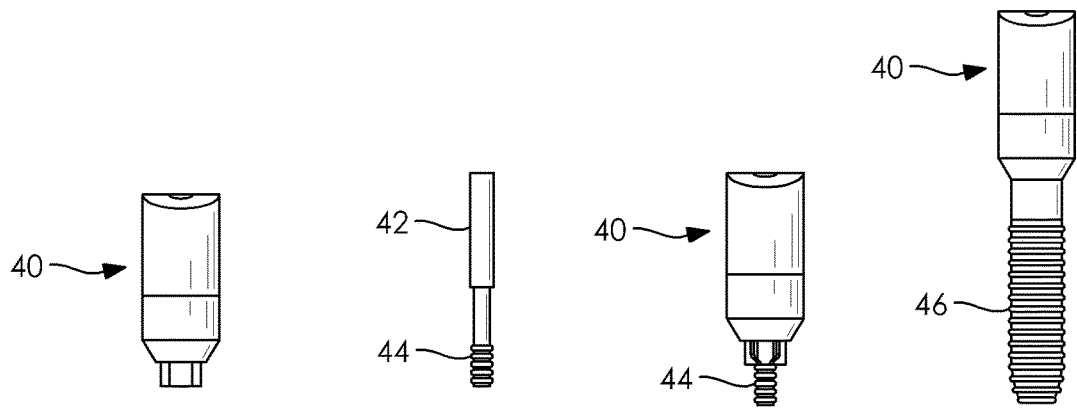
FIG. 4A is a side view of a scan body that can be supported by an implant.
FIG. 4B is a side view of a post for securing a san body to an implant.
FIG. 4C is a side view of the post inside of the scan body.
FIG. 4D is a side view of a scan body supported on an implant.

The instant invention involves the use of modified scan bodies in the functional implant rehabilitation of patients by providing highly reliable, reversible, fixed points of reference enabling a fully digital workflow with the most commonly occurring clinical variations which include:

VARIATION 1: The patient has a debilitated/terminal dentition that is stable and in need of complete edentulation (removal of all existing natural teeth and/or restorations);

VARIATION 2: The patient has a debilitated/terminal dentition that is unstable and in need of complete edentulation (removal of all existing natural teeth and/ or restorations); and VARIATION 3: The patient has previously had the complete removal of all natural teeth and associated restorations and either has no existing prostheses (complete removable dentures) or has existing removable prostheses that they are looking to enhance by utilizing dental implants to stabilize a removable prosthesis or convert to a fixed/non-removable prosthesis.

This invention involves the use of Scannable Temporary Anatomic References, referred to herein as S.T.A.R., to provide very reliable, fixed points of reference to enable the technician to relate and superimpose the dental implant position to a pre-planned restoration with a very high degree of accuracy throughout the entire workflow.

In FIG. 1, skeletally supported S.T.A.R.s 10 are fixed, temporarily, in the upper jaw bone. Tooth supported S.T.A.R.s 12 are fixed, temporarily, on teeth surfaces and may be cemented thereto. Both of these have a plurality of exposed surfaces which are easily seen and captured by an intraoral scanner.

Details of one example of a skeletally supported S.T.A.R. 10 are seen in FIGS. 2A and 2B. The skeletally supported S.T.A.R. 10 has a threaded post 14 for engaging a jaw bone. It is self tapping and provides highly reliable primary stability when engaged in a jaw bone. A flange (not shown) may be provided to prevent over tightening. At the other end of the skeletally supported S.T.A.R. is a head 16 which has a number of scannable surfaces created, for example, by embossing, machining, or other suitable means. Between the head 16 and the threaded post 14 is a highly polished transmucosal element 18 which seats in the soft tissue of the jaw when the threaded post 14 engages the jaw bone. It is designed to reduce trauma to the soft tissue and has a plaque resistant surface. The head 16, as shown in FIG. 2B, has a torque receiving configuration indicated at 20 for delivering the S.T.A.R. 10 into the jaw bone. It is preferred that the head 16 have a minimally reflective surface to enhance capture with an intraoral scanner. A flange may be provided to prevent over tightening.

An example of a tooth supported S.T.A.R. 30 is shown in FIGS. 3A and 3B. The S.T.A.R. 30 has a scannable head 32 which has a number of scannable surfaces created, for example, by embossing, machining, or other suitable means. The head 32 has a receptacle to aid in placement of the device on a tooth. It is preferred that the head 32 have a minimally reflective surface to enhance capture with an intraoral scanner. The underside of the S.T.A.R. may be textured to enhance bonding of the S.T.A.R. 30 to a tooth as by cement, for example.

Figures 4E, 4F:
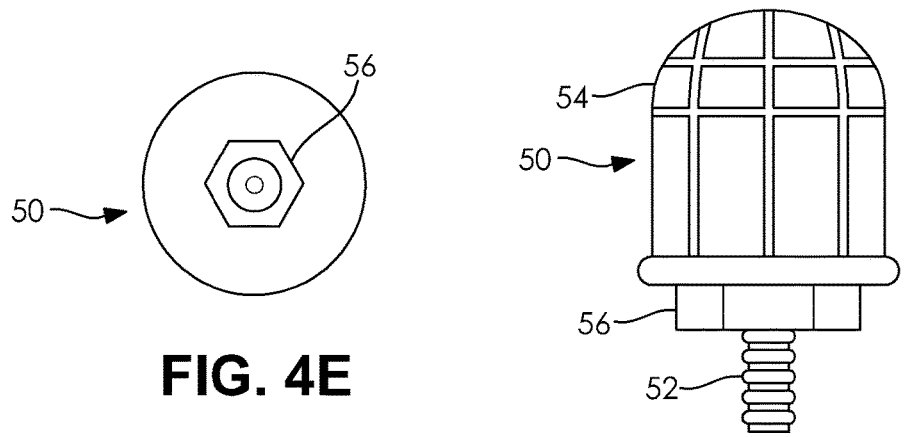
FIG. 4E is a body view of a scan body that can be supported by an implant.
FIG. 4F is a side view of a scan body that can be supported by an implant.

An implant supported S.T.A.R. is indicated generally at 40 in FIGS. 4A, 4B, and 4D. The S.T.A.R. 40 has a central bore to receive a shaft 42. The lower end 44 of the shaft 42 is threaded and is operable to engage a threaded bore in an implant 46. An example of an implant supported S.T.A.R. is indicated at 50 in FIGS. 4E and 4F. The S.T.A.R. 50 has a threaded telescoping fixation screw 52 for engaging a threaded bore in an implant. At the other end of the S.T.A.R. 50 is a head 54 which would include a torque receiving configuration. The head 54 has a number of scannable surfaces created, for example, by embossing, machining, or other suitable means. It is preferred that the head 54 have a minimally reflective surface to enhance capture with an intraoral scanner. A geometric telescoping element 56 is provided between the head and the screw 52. An extended flange 58 is provided at the bottom of the head 54. The fixation screw and the geometric telescoping element 56 may be configures according to the standards adopted by a specific manufacturer.

Figure 5A:
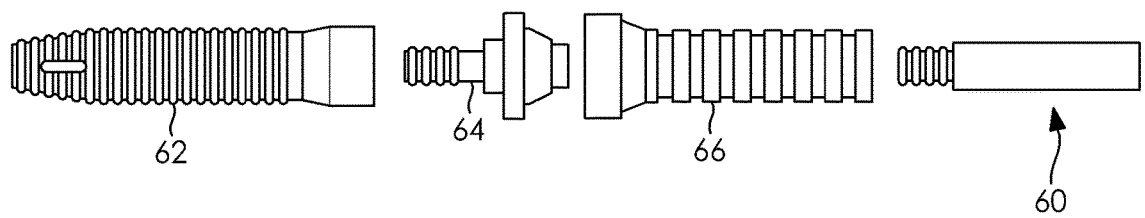
FIG. 5A is an exploded view of a prosthetic screw assembly including a scan body.
Figure 5B:
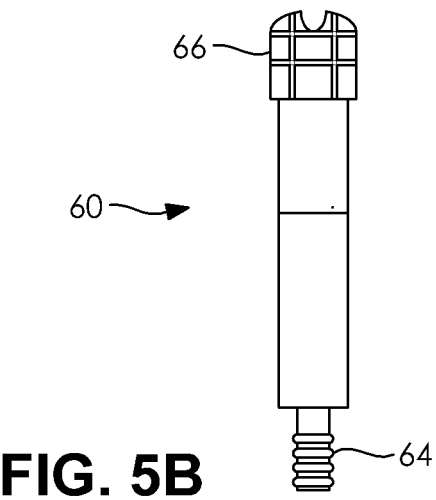
FIG. 5B is a side view of a prosthetic screw including a scan body.

A prosthetic screw incorporating a S.T.A.R. is indicated at 60 in FIGS. 5A and 5B. It is supported in a titanium coping 66 which is seated on an implant abutment 64 which, in turn, is supported in an implant 62. As seen in FIG. 5B, the prosthetic screw incorporating a S.T.A.R. 60 has a threaded lower portion 64. At the other end, there is a scannable head 66 which has a number of scannable surfaces created, for example, by embossing, machining, or other suitable means. The head 66 may be provided with a torque receiving configuration (not shown) for securing the prosthetic screw incorporating a S.T.A.R. 60 in the titanium coping. It is preferred that the head 66 have a minimally reflective surface to enhance capture with an intraoral scanner.

Figure 6:
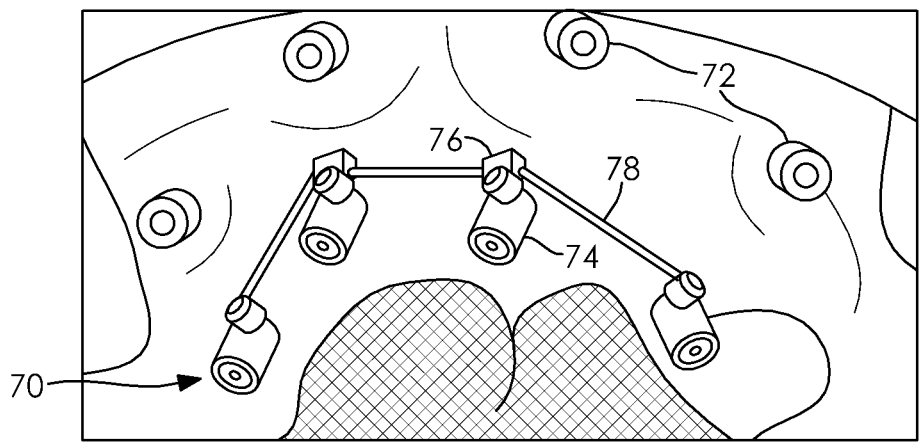
FIG. 6 is a view of a verification jig.

Turning now to FIG. 6, a verification jig 70 is made up of a set of modified external fixation devices 74 which support rigid bars 78. Adjustable swivel-crimps 76 secure these structures allowing for spatial variations. The fixation devices may be telescoped over implant supported scan bodies 72 to provide a "verification jig" and "pathway for scanning." Given that the dimensions of these elements are known, they can be incorporated within the software algorithms as dimensional references to further improve accuracy and precision as between the actual and virtual situations. This modified external fixation device may serve as a scannable frame. This provides a stable landmark for the intraoral scanners to follow while crossing the arch, and would eliminate scanning errors brought about by the surgical alteration of the landmarks inherent in this type of procedure.

Figure 7A:
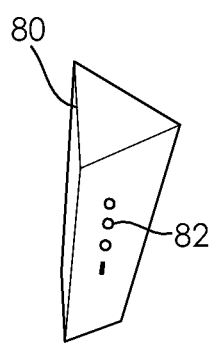
FIG. 7A is a perspective view of an enhanced implant supported fixture mount.
Figure 7B:
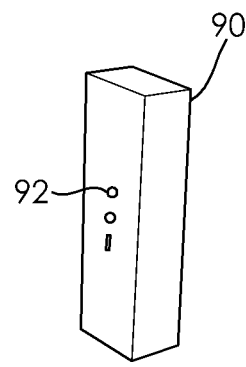
FIG. 7B is a perspective view of another embodiment of an enhanced implant supported fixture mount.
Figure 7C:
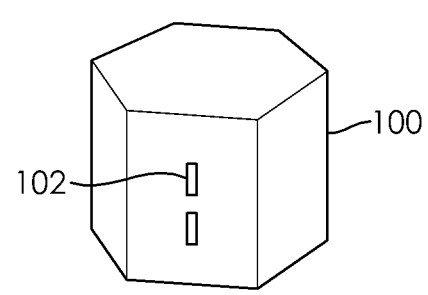
FIG. 7C is a perspective view of another embodiment of an enhanced implant supported fixture mount.

In FIGS. 7A, 7B, and 7C, three examples of enhanced implant supported fixture mounts 80, 90, and 100 are illustrated conceptually. Each has a unique geometry which may be scanned and used to convey information about the fixture mounts such as size, manufacturer, lot number, and the like. Further, or alternatively, the fixture mounts 80, 90, and 100 may have 2D or 3D indicia, generally indicated at 82, 92, and 102 which could also be used to identify the manufacturer, make, and/or model of the implant within the design software thereby reducing manual selection errors of components and connection types that might otherwise occur during the design process. This encoding may take the form of, but is not limited to, geometry and embossing. The 3D encoding can also create efficiencies with respect to inventory management and provide a quality control check in the dental laboratory reducing the frequency of manual selection errors.

Generally speaking, all S.T.A.R.s share the following common design features: titanium and/or similar alloy (the booth supported S.T.A.R. can support an instance of being made from ceramic.), minimally reflective and provide surface features/marking intended to aid the technician and/or dentist in identifying specific features to aid superimposition. The skeletal supported S.T.A.R. would feature a self-tapping (driving) screw for optimal stability, as well as a flange to prevent over seating.

According to one example of a method according to the invention, the workflow process begins in the usual manner of diagnostics and initial restoration design following the methodology outlined above. Motivational mock-ups are used to visually communicate the proposed dental outcome directly to the patient. In the case of Variation 1, where the existing teeth are stable, these mock-ups are made in relation to the patient's existing face and/or teeth and, once they are approved by the patient, serve as a blue print during the restoration design process. In this instance the teeth serve as a reference for the mock-up or trial smile.

If, however, the teeth are present but not stable enough to be used as a reference, as in Variation 2, then at least three skeletally supported S.T.A.R.s would be used to provide a reliable frame of reference.

In variations 1 and 2, prior to extractions, a minimum of three skeletally supported S.T.A.R.s are installed into the maxillary (upper jaw) and/or mandibular (lower Jaw) bone, away from areas of the planned surgical guide fixation sites (if utilizing a guided technique), extraction(s), and/or alveolar bone reduction. In Variation 3, the surgeon's preferred method of surgical guide form and fixation is considered and the S.T.A.R.s are placed to avoid these fixation sites. It is very important that the surgeon adheres to this fact, as it is critical to maintaining the S.T.A.R.s as stable reference points throughout the workflow. As more and more cases are placed utilizing a guided or "pre-planned" technique, surgeons would be generally aware of the sites best suited for the S.T.A.R.s to be positioned. In all variations, once installed, an intraoral scan is obtained of the dental arch or arches being restored. Obtaining this scan relates the patient's existing dentition or, if edentulous, their prosthesis, to the location of the S.T.A.R.s.

In Variations 1 and 2, the teeth are extracted with/without the hard and soft tissue recontouring with care being taken not to disturb the aforementioned S.T.A.R.s. The dental implants are then placed using a guided or non-guided technique. In Variation 3, no extractions, implants are then placed using a guided or non-guided technique. In all variations, implant-supported S.T.A.R.s may then be attached to the implants (or in another instance of this invention, be one in the same as the implant delivery mechanism as described above with reference to FIGS. 4A through 4F. One benefit of having the implant fixture mount designed as a scan body is that it creates an efficiency in the workflow as the surgeon may avoid the step of removing and replacing an additional component. It is the accepted method to deliver a dental implant with a removable fixture mount which in some instances may also serve as an analogue impression coping. Once the implant has been delivered, this mount, if not already an impression coping, is removed and is replaced by an impression coping. Once placed, an analogue impression is made in the usual manner. The presence of the skeletal S.T.A.R.s would interfere with an analogue impression and thus cannot be used in an analogue approach as a reference to the original design. The instant invention overcomes this obstacle by using a digital impression technique where an implant supported scan body is placed. Again, this step is eliminated when using the Implant fixture mount S.T.A.R. invention as it would have already been in place.

In the modified implant fixture mount variation of this invention, the implant fixture mount serves as the scan body. This is analogous to the combined implant fixture mount/impression coping used by some dental implant manufacturers. These fixture mount S.T.A.R.s are designed to be fabricated in titanium and/or similar alloy, minimally reflective and provide surface features/marking intended to aid the technician and/or dentist in identifying specific features to aid superimposition. If a guided technique is employed, a flange modification to this device serves as a vertical stop and timing identifier for 3D implant installation.

Once the implants have been placed, and if the implants meet the guidelines for immediate restoration/load (adequate primary stability), the dental arch is once again scanned to include all of the skeletal and implant supported S.T.A.R.s. This provides for reproducible reference points for pre-surgical and post-surgical model superimposition as well as capturing the three-dimensional position and internal rotational positioning of the implants' internal geometry to enhance accuracy of the working virtual design model for the technician.

At this point, temporary healing collars specific to the implant system being used are placed and the surgical incisions (if any) are closed and the scans are forwarded to the dental technician to create an implant-supported prosthesis based precisely on the original design, thereby completely eliminating the lengthy conversion process. This is unique to this new methodology and its associated inventions.

The specialist or general dentist then confirms receipt and archiving of the received file(s) by the dental lab. The lab reviews the intraoral scan files for quality control purposes, verifies the inclusion of the necessary tooth/teeth, skeletal, and implant scan bodies, and notifies the general dentist or specialists if a new capture is necessary.

Once imported into the design software environment, the technician then uses the S.T.A.R.s to precisely superimpose the initial/"pre-prep" (before) model with virtual design and the post-op "prep" (after) model within the CAD software utilizing superimposition methods inclusive of, but not limited to: automatic, manual ("three-point/multiple point alignment"), and/or surface mapping. This ensures precision with respect to the principles of facially driven dentistry as determined by the initial motivational mock-up and its relation to the teeth and implants as established by the tooth supported scan bodies and scan body fixture mounts.

The incorporation of individual S.T.A.R. component DME files (library files of the physical specifications of tooth supported scan bodies, skeletally supported scan bodies, scan body implant fixture mounts and modified external fixation hardware) into the libraries of design software would further aid the design process in terms of both accuracy and efficiency.

The implant supported S.T.A.R.s, and associated verification jig, if used, are then removed and the patient awaits restoration fabrication and delivery.

Once the .stl files have been imported into the design environment, the technician designs/adapts the restoration to the implant platform and may further adapt to the occlusion using various methodologies (digital bite registrations, virtual articulators, motion capture technology, etc.). The restoration is then created following the recommended specifications for the material being utilized.

The technician sends the restoration to the milling station to be manufactured with the material agreed upon by the dentist and technician. A working model may also be sent to a 3D printer and printed, if the technician prefers. The model can then be fitted with the necessary implant replicas and secured using the specifications of the device being used.

If provided, the physical verification jig is checked on the 3D printed model. Temporary abutments are modified to the contours/needs of the restoration. The final restoration (provisional or final) is finished in the usual manner on the final model.

The restoration is delivered to the specialist or general dentist to be placed in the mouth, and the fit and occlusion are checked in the usual manner and adapted, if necessary.

In another instance of the invention, S.T.A.R.s may be used for highly accurate cross-mounting of dental implant cases. In the current analog method, a "pick-up" impression of the patient's implant prosthesis allows the dentist and technician to relate the patient's tooth position and arch form (as established by the restoration) to the implants. This is extremely important since this temporary restoration serves as a working prototype for the final restoration and encapsulates the patient's esthetic preferences and functional occlusal biomechanics. An analogous, digital method is not currently available. This invention paves the way. By modifying prosthetic screws to serve as S.T.A.R.s the implant/abutment position can be precisely related to the patient's restoration and subsequently used to create the final restoration. This is made possible by the fact that the modified prosthetic screw secures the prosthesis in precisely the same manner as a standard prosthetic screw. Since the dimensions of the titanium cylinder are specific to the abutment geometry for a given manufacturer, it is possible to establish the abutment position highly accurately—this is precisely how open/closed tray impression copings function in communicating the implant abutment in 3D space when using an analogue technique. In addition, the simultaneous capture of the dental prosthesis with these prosthetic screw S.T.A.R.s allows for highly accurate recording cross-mounting of the prosthesis, and further aids the design of the final restoration.

Another application of this invention could involve the use of technology from the motion picture industry (i.e. Motion Capture/Mocap), where fixed points of reference are placed on actors to enable the capture of their movements and fusion with the animated (CGI) characters to produce life like results. S.T.A.R.s, especially tooth and skeletal supported types, may be used in a similar manner to precisely capture any patient's specific mandibular envelope of motion and occlusal relations creating a more accurate model of the patient during the design process.

As technologies evolve, so do the possibilities, and the S.T.A.R. concept and associated inventions (e.g. skeletal, tooth supported S.T.A.R.$) allow Augmented Reality Integration to merge with dentistry and medicine alike. Augmented Reality is similar to the better-known concept of virtual reality, in which the user's vision is completely immersed in a virtual world. AR does not replace the real environment with a fabricated one. Instead, a live view of the real world is obtained and enhanced with the addition of virtual objects that appear to coexist with real objects in the scene. The virtual objects are usually intended to provide additional perceptual information to the user that would otherwise be unavailable. The exciting possibilities of augmented reality are currently entering the automotive and other industries.

AR has enormous potential in the dental industry, due to its ability to fuse 3D scan data with a view of the patient and can be used to provide visual support for diagnosis and treatment. This is all predicated on having stable points of fixed references and the S.T.A.R. inventions provide this critical element.

Possibilities include and are not limited to real-time: virtual prep guides, crown lengthening guides, bone reduction guides, other procedure/technique wizards and innovative support services.

The foregoing description of specific examples of the invention is provided to enable one skilled in the art to practice the invention. However, the methods and the devices of the invention have utility beyond that described above and may be modified without departing from the spirit and scope of the invention. In other words, the foregoing description is only intended to illustrate, but not limit, the invention.

I claim:

1. A method for providing a dental implant-based restoration for a human patient, said method comprising:
    physically inserting at least three skeletally-supported scan bodies into the mandible or maxilla of the patient, each skeletally-supported scan body comprising a threaded post and an intraoral scannable head, the scannable head having a plurality of intraoral scanning surfaces;
    physically performing at least one first intraoral scan of a dental arch of the patient to provide a first digital data set relating a dental structure of the patient to the at least three skeletally-supported scan bodies;
    physically implanting at least one implant into the patient mandible or maxilla and coupling at least one implant-supported scan body to the implant;
    physically inserting an intraoral verification jig over the at least one implant-supported scan body or over the at least three skeletally-supported scan bodies, the intraoral verification jig comprising at least one external fixation device and at least one rigid bar coupled to the at least one external fixation device, the at least one rigid bar and the at least one external fixation device having predetermined dimensions;
    physically performing at least one second intraoral scan of the dental arch of the patient to provide a second digital data set relating the at least one implant-supported scan body and intraoral verification jig to the at least three skeletally-supported scan bodies;
    preparing a digital prototype of the restoration, the digital prototype comprising a digital alignment, using the at least three skeletally-supported scan bodies, of a first image from the first digital data set with a second image from the second digital data set;
    physically producing the dental implant-based restoration using the digital prototype of the restoration; and
    physically coupling the dental implant-based restoration to the at least one implant.

2. The method of claim 1, further comprising:
    after the first digital data set is collected, extracting at least one tooth.

3. The method of claim 1, wherein the intraoral verification jig further comprises an adjustable swivel crimp coupled to the at least one external fixation device to clamp and secure the at least one rigid bar.

4. The method of claim 1, wherein the dental structure of the first intraoral scan is at least one dental structure selected from the group consisting of: existing teeth, a prosthesis, an edentulous ridge, and combinations thereof.

5. The method of claim 1, wherein the step of digitally aligning the first image from the first digital data set with the second image from the second digital data set is performed digitally by software operating in a computing system using the at least three skeletally-supported scan bodies as common reference points.

6. The method of claim 1, wherein the step of digitally aligning the first image from the first digital data set with the second image from the second digital data set is performed digitally by software operating in a computing system by digitally superimposing the second image with the first image using the at least three skeletally-supported scan bodies as common reference points to produce a digital CAM output file for the dental implant-based restoration.

7. The method of claim 1, wherein the threaded post of each skeletally-supported scan body is self-tapping.

8. The method of claim 7, wherein each skeletally-supported scan body further comprises a flange to prevent over seating.

9. The method of claim 1, wherein the implant has a threaded bore and the at least one implant-supported scan body comprises:
    an intraoral scannable temporary anatomic reference comprising:
        an intraoral scannable head having a plurality of scannable surfaces; and a telescoping fixation screw for engaging the threaded bore of the implant.

10. The method of claim 9, wherein the step of coupling the dental implant-based restoration further comprises:
removing the intraoral scannable temporary anatomic reference from the at least one implant; and
inserting the dental implant-based restoration into the threaded bore of the implant.

11. The method of claim 10, further comprising:
removing the at least three skeletally-supported scan bodies from the patient mandible or maxilla.

12. The method of claim 1, wherein the step of physically inserting the at least three skeletally-supported scan bodies further comprises:
physically inserting the at least three skeletally-supported scan bodies in the mandible or maxilla spaced apart from any surgical guide fixation sites, or from any extraction sites, or from any areas of alveolar bone reduction.

13. The method of claim 1, wherein the intraoral verification jig further comprises an adjustable swivel crimp coupled to the at least one external fixation device to clamp and secure the at least one rigid bar.

14. The method of claim 1, wherein the intraoral verification jig provides one or more dimensional references in the second data set.

15. A method for providing a dental implant-based restoration for a human patient, said method comprising:
physically inserting at least three skeletally-supported scan bodies into the mandible or maxilla of the patient, each skeletally-supported scan body comprising a threaded post coupled to an intraoral scannable head, the scannable head having a plurality of intraoral scanning surfaces;
physically performing at least one first intraoral scan of a dental arch of the patient to provide a first digital data set relating any existing teeth, prosthesis, or edentulous ridge of the patient to the at least three skeletally-supported scan bodies;
using at least one fixture mount, physically implanting at least one implant into the patient mandible or maxilla, the at least one fixture mount comprising at least one scan body having a plurality of intraoral scannable surfaces;
physically inserting an intraoral verification jig over the at least one implant or over the at least three skeletally-supported scan bodies, the intraoral verification jig comprising at least one external fixation device and at least one rigid bar coupled to the at least one external fixation device, the at least one rigid bar and the at least one external fixation device having predetermined dimensions;
physically performing at least one second intraoral scan of the dental arch of the patient to provide a second digital data set relating the at least one fixture mount and the intraoral verification jig to the at least three skeletally-supported scan bodies;
preparing a digital prototype of the restoration, the digital prototype comprising a digital alignment, using the at least three skeletally-supported scan bodies, of a first image from the first digital data set with a second image from the second digital data set;
physically producing the dental implant-based restoration using the digital prototype of the restoration; and
physically coupling the dental implant-based restoration to the at least one implant.

16. The method of claim 15, wherein the at least three skeletally-supported scan bodies are implanted in the mandible or maxilla spaced apart from any surgical guide fixation sites, or from any extraction sites, or from any areas of alveolar bone reduction.

17. The method of claim 15, wherein the intraoral verification jig further comprises an adjustable swivel crimp coupled to the at least one external fixation device to clamp and secure the at least one rigid bar.

18. A method for providing a dental implant-based restoration for a human patient, said method comprising:
physically inserting at least three skeletally-supported scan bodies into the mandible or maxilla of the patient spaced apart from any surgical guide fixation sites, or from any extraction sites, or from any areas of alveolar bone reduction, with each skeletally-supported scan body comprising a threaded post coupled to an intraoral scannable head, the intraoral scannable head having a plurality of intraoral scanning surfaces;
physically performing at least one first intraoral scan of a dental arch of the patient to provide a first data set relating any existing teeth, prosthesis, or edentulous ridge of the patient to the at least three skeletally-supported scan bodies;
using at least one fixture mount, physically implanting at least one implant into the patient mandible or maxilla, and either physically removing the fixture mount and physically coupling at least one implant-supported scan body to the implant, or when the at least one fixture mount comprises at least one scan body having a plurality of scannable surfaces, using the fixture mount as a scan body;
physically inserting an intraoral verification jig over the at least one implant-supported scan body or over the at least three skeletally-supported scan bodies, the intraoral verification jig comprising at least one adjustable swivel crimp, at least one external fixation device and at least one rigid bar coupled through the at least one adjustable swivel crimp to the at least one external fixation device, the at least one rigid bar and the at least one external fixation device having predetermined dimensions;
physically performing at least one second intraoral scan of the dental arch of the patient to provide a second data set relating the at least one implant-supported scan body, or verification jig, or the fixture mount to the at least three skeletally-supported scan bodies;
preparing a digital prototype of the restoration, the digital prototype comprising a digital alignment, using the at least three skeletally-supported scan bodies, of a first image from the first digital data set with a second image from the second digital data set;
physically producing the dental implant-based restoration using the digital prototype of the restoration; and
physically coupling the dental implant-based restoration to the at least one implant.

* * * * *